United States Patent
Jujjavarapu et al.

(10) Patent No.: US 12,379,471 B1
(45) Date of Patent: Aug. 5, 2025

(54) LIDAR SENSOR SYSTEM WITH IMPROVED OPTICAL ISOLATION FEATURES

(71) Applicant: Aurora Operations, Inc., Pittsburgh, PA (US)

(72) Inventors: Pruthvi Jujjavarapu, Palo Alto, CA (US); Sen Lin, Mountain View, CA (US); Andrew Steil Michaels, Los Altos, CA (US); Imbert Yuyen Wang, Santa Clara, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/827,054

(22) Filed: Sep. 6, 2024

(51) Int. Cl.
*G01S 7/481* (2006.01)
*G01S 7/4912* (2020.01)
*G01S 7/4913* (2020.01)

(52) U.S. Cl.
CPC .......... *G01S 7/4816* (2013.01); *G01S 7/4913* (2013.01); *G01S 7/4917* (2013.01)

(58) Field of Classification Search
CPC .............................. G01S 7/4917; G01S 7/4816
See application file for complete search history.

(56) References Cited

U.S. PATENT DOCUMENTS

| | | | |
|---|---|---|---|
| 2017/0184450 A1* | 6/2017 | Doylend | G01S 7/4817 |
| 2017/0299697 A1* | 10/2017 | Swanson | G02B 6/29302 |
| 2021/0167230 A1* | 6/2021 | Pelletier | H01L 31/02327 |
| 2021/0242651 A1* | 8/2021 | Dudley | G02B 6/1225 |
| 2022/0026542 A1* | 1/2022 | Morimoto | H10F 39/184 |
| 2023/0161105 A1* | 5/2023 | Lin | G02B 6/136 |
| | | | 216/24 |

\* cited by examiner

*Primary Examiner* — Hovhannes Baghdasaryan
*Assistant Examiner* — Zhengqing Qi
(74) *Attorney, Agent, or Firm* — Dority & Manning, P.A.

(57) ABSTRACT

A LIDAR system for a vehicle can include a receiver die having one or more light sensitive components and one or more optical isolation trenches configured to optically isolate the one or more light sensitive components on the receiver die; wherein the one or more optical isolation trenches are arranged such that light does not pass in a direct path through the receiver die.

20 Claims, 6 Drawing Sheets

LIDAR SENSOR SYSTEM WITH IMPROVED OPTICAL ISOLATION FEATURES

BACKGROUND

Light Detection and Ranging (LIDAR) systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment.

The emitter and/or receiver often includes photonic circuitry formed on a semiconductor substrate such as a silicon die. Silicon photonics dies can provide for precise formation of the photonic circuitry through, for example, photolithography. Other optical components of a LIDAR sensor system may also be formed on semiconductor substrates, while still others are formed on or connected to components made using other semiconductor materials such as, for example, a group III-V semiconductor, gallium arsenide (GaAs), and/or other suitable materials.

SUMMARY

Aspects and advantages of implementations of the present disclosure will be set forth in part in the following description, or may be learned from the description, or may be learned through practice of the implementations.

Example aspects of the present disclosure are directed to LIDAR systems. As further described herein, the LIDAR systems can be used by various devices and platforms (e.g., robotic platforms, etc.) to improve the ability of the devices and platforms to perceive their environment and perform functions in response thereto (e.g., autonomously navigating through the environment).

A LIDAR system may include one or more photodetectors to convert reflected light to a signal that can be processed for detection by the LIDAR system (e.g., an electrical signal or optical signal). Light can enter the environment surrounding a photodetector (e.g., internal to the LIDAR system) from various sources, such as misaligned couplings and other leakages. This stray light can be picked up by the photodetector and cause reduced detection accuracy. The present disclosure provides for LIDAR sensor systems having improved optical isolation features. These optical isolation features can provide improved optical isolation within the LIDAR sensor system. For instance, the optical isolation features can reduce an amount of stray light incident on photodetector(s) and other light-sensitive devices within the LIDAR sensor system, thereby providing improved detection fidelity and accuracy. In particular, the present disclosure provides for forming optical isolation trenches, including airgap trenches and filled trenches, with particular spatial relationships to a light-sensitive device (e.g., a photodetector). Forming the trenches can be accomplished through various techniques, such as etching (e.g., dry etching, wet etching), ablation, (e.g., laser ablation), cutting, or other suitable techniques.

The arrangement of the optical isolation trenches relative to the light-sensitive device can be such that the trenches absorb, block, or reflect (by total internal reflection) stray light that may otherwise be incident on the light-sensitive device. As one example, a substrate can include a first side (e.g., having an SiO2 layer) opposite a second side (e.g., having a silicon layer). The light-sensitive device can be on or embedded within the first side. One example trench is formed on the first side. The trench may extend a depth into the substrate. The depth may be less than about half of a total thickness of the substrate. The trench may be an airgap trench (e.g., filled with air, or alternatively a vacuum or other substance immediately surrounding the substrate), or a filled trench filled with some light-absorbing material, such as a metal or a fluid including carbon nanoparticles dispersed in nitrocellulose. Another example trench is formed on the second side. This trench may extend a depth into the substrate, and the depth may be any suitable depth, up to almost an entirety of the silicon layer. In another approach, the trenches may undercut the light-sensitive device to form a cavity beneath the light-sensitive device. The cavity may be filled with optically absorbing material to optically isolate the device from stray light. As another example, a substrate can include a first end and a second end, with trenches formed on each end. The light-sensitive device(s), such as photodiodes, can be positioned between the two ends. The trenches can prevent a direct path for light through the receiver die.

Aspects of the present disclosure can provide a number of technical effects and benefits. As one example, including one or more optical isolation trenches relative to a light-sensitive device can provide for a reduced amount of stray light incident on the light-sensitive device. The reduced amount of stray light can, in turn, provide for improved fidelity of detections from the light-sensitive device, due at least in part to the reduced amount of stray light in competition with intended light related to the detection. Additionally or alternatively, the reduced amount of stray light can provide for reduced power consumption of a LIDAR sensor system incorporating these aspects. For instance, the reduced amount of stray light in competition with the intended light can provide for use of a lesser optical signal to drive the LIDAR sensor system, requiring less power to generate the optical signal than in a comparable LIDAR sensor system not including the aspects of the present disclosure.

For instance, in an aspect, the present disclosure provides a light detection and ranging (LIDAR) system for a vehicle. The LIDAR system includes a receiver die having one or more light sensitive components. The LIDAR system includes one or more optical isolation trenches configured to optically isolate the one or more light sensitive components on the receiver die. The one or more optical isolation trenches are arranged such that light does not pass in a direct path through the receiver die.

In some implementations, the receiver die has a first end and a second end opposite the first end, and the one or more optical isolation trenches include a first optical isolation trench extending along the first end and a second optical isolation trench extending along the second end.

In some implementations, at least one of the first optical isolation trench or the second optical isolation trench includes: a first lateral portion and a second lateral portion along a respective end of the receiver die; a third lateral portion closer to a center of the receiver die than the first lateral portion and the second lateral portion are to the center of the receiver die; a first radial portion connected to the first lateral portion and the third lateral portion; and a second radial portion connected to the second lateral portion and the third lateral portion.

In some implementations, at least one of the first radial portion or the second radial portion extend along a third end of the receiver die, the third end of the receiver die orthogonal to the first end and the second end.

In some implementations, the third end of the receiver is proximate at least one waveguide directing light toward the receiver die, and the receiver die further includes a third optical isolation trench extending along the third end.

In some implementations, the at least one waveguide includes a local oscillator (LO) input or a receive (Rx) signal input.

In some implementations, the receiver die further includes a fourth end opposite the third end, and the fourth end includes one or more signal outputs.

In some implementations, the one or more signal outputs include one or more of a voltage signal, a ground signal, or a detection signal.

In some implementations, the one or more light sensitive components include one or more photodetectors.

In some implementations, the one or more photodetectors include at least one balanced pair of photodiodes.

In some implementations, the at least one balanced pair of photodiodes is coupled to a mixer configured to receive at least a receive (Rx) signal and produce one or more detection signals based on the receive signal.

For instance, in an aspect, the present disclosure provides a LIDAR system for a vehicle. The LIDAR system includes a receiver die. The receiver die includes one or more photodetectors. The receiver die includes a mixer coupled to the photodetectors, the mixer configured to receive at least a receive (Rx) signal and produce one or more detection signals based on the receive signal. The receiver die includes one or more optical isolation trenches configured to optically isolate the one or more photodetectors on the receiver die. The one or more optical isolation trenches are arranged such that light does not pass in a direct path through the receiver die.

In some implementations, the one or more photodetectors include at least one balanced pair of photodiodes.

In some implementations, the receiver die has a first end and a second end opposite the first end and the one or more optical isolation trenches include a first optical isolation trench extending along the first end and a second optical isolation trench extending along the second end.

In some implementations, at least one of the first optical isolation trench or the second optical isolation trench includes: a first lateral portion and a second lateral portion along a respective end of the receiver die; a third lateral portion closer to a center of the receiver die than the first lateral portion and the second lateral portion are to the center of the receiver die; a first radial portion connected to the first lateral portion and the third lateral portion; and a second radial portion connected to the second lateral portion and the third lateral portion.

In some implementations, at least one of the first radial portion or the second radial portion extend along a third end of the receiver die, the third end of the receiver die orthogonal to the first end and the second end.

For instance, in an aspect, the present disclosure provides a LIDAR system for a vehicle. The LIDAR system includes a receiver die. The receiver die includes one or more photodetectors. The receiver die includes an optical hybrid coupled to the photodetectors, the optical hybrid configured to receive at least a receive (Rx) signal and produce one or more detection signals based on the receive signal. The receiver die includes one or more optical isolation trenches configured to optically isolate the one or more photodetectors on the receiver die. The one or more optical isolation trenches are arranged such that light does not pass in a direct path through the receiver die.

In some implementations, the one or more photodetectors include a first balanced pair of photodiodes and a second balanced pair of photodiodes.

In some implementations, the optical hybrid is configured to receive a local oscillator (LO) signal and to combine the local oscillator (LO) signal and the receive (Rx) signal to produce first and second intermediate signals that are respectively provided to the first and second balanced pairs of photodiodes.

In some implementations, the receiver die includes a first end and a second end opposite the first end, and the one or more optical isolation trenches include a first optical isolation trench extending along the first end and a second optical isolation trench extending along the second end.

Other example aspects of the present disclosure are directed to other systems, methods, apparatuses, tangible non-transitory computer-readable media, and devices for manufacturing semiconductor devices for a LIDAR system, as well as motion prediction and/or operation of a device (e.g., a vehicle) including a LIDAR system having a LIDAR module with one or more semiconductor devices according to example aspects of the present disclosure.

These and other features, aspects and advantages of various implementations of the present disclosure will become better understood with reference to the following description and appended claims. The accompanying drawings, which are incorporated in and constitute a part of this specification, illustrate implementations of the present disclosure and, together with the description, serve to explain the related principles.

DETAILED DESCRIPTION

The following describes the technology of this disclosure within the context of an autonomous vehicle for example purposes only. As described herein, the technology is not limited to an autonomous vehicle and can be implemented within other robotic and computing systems as well as various devices. For example, the systems and methods disclosed herein can be implemented in a variety of ways including, but not limited to, a computer-implemented method, an autonomous vehicle system, an autonomous vehicle control system, a robotic platform system, a general robotic device control system, a computing device, etc.

Figure 1:
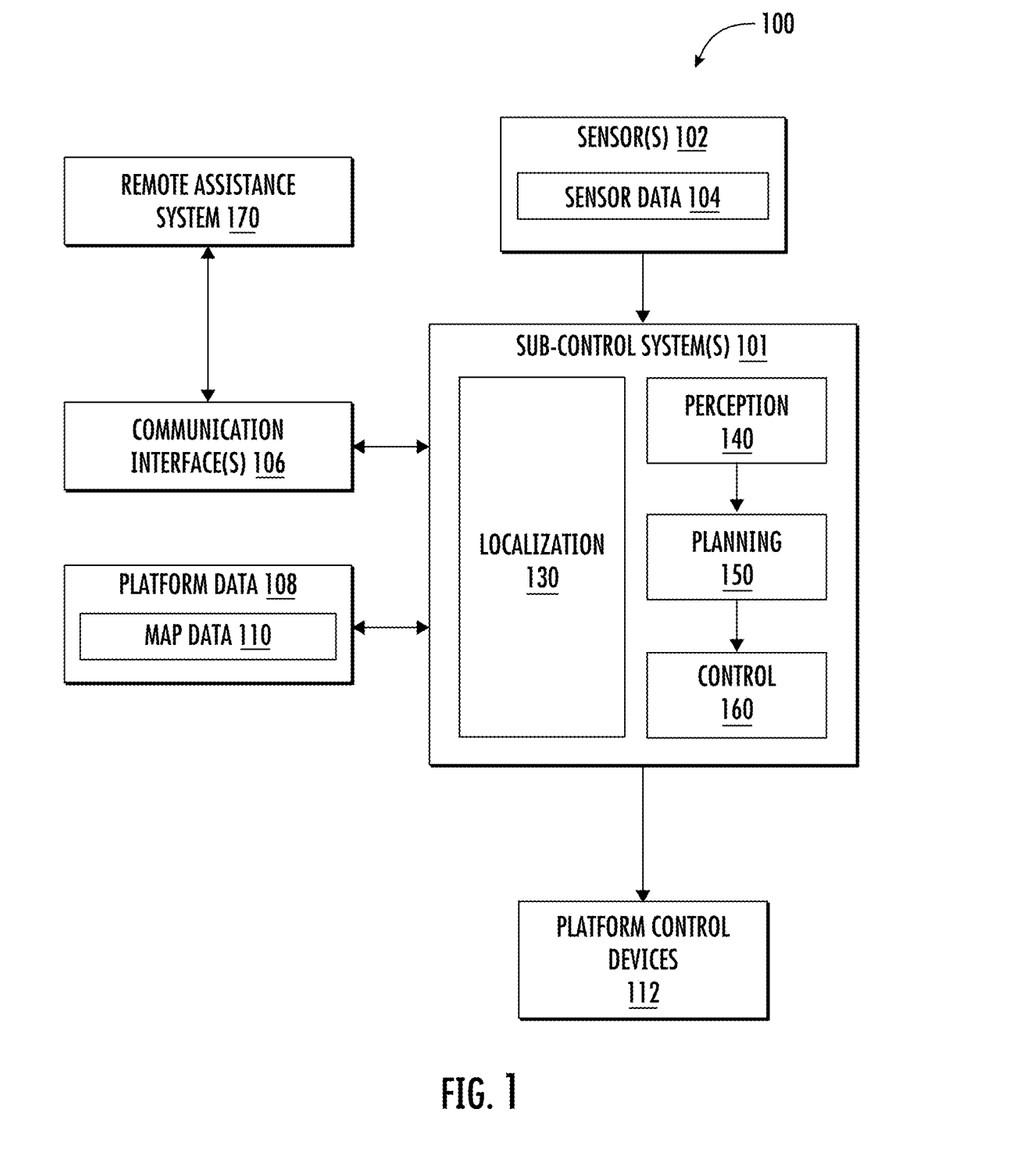
FIG. 1 depicts a block diagram of an example system according to some implementations of the present disclosure.

With reference to FIGS. 1-7, example implementations of the present disclosure are discussed in further detail. FIG. 1 depicts a block diagram of an example autonomous vehicle control system 100 for an autonomous vehicle according to some implementations of the present disclosure. The autonomous vehicle control system 100 can be implemented by a computing system of an autonomous vehicle). The autonomous vehicle control system 100 can include one or more sub-control systems 101 that operate to obtain inputs from sensor(s) 102 or other input devices of the autonomous vehicle control system 100. In some implementations, the sub-control system(s) 101 can additionally obtain platform data 108 (e.g., map data 110) from local or remote storage. The sub-control system(s) 101 can generate control outputs for controlling the autonomous vehicle (e.g., through platform control devices 112, etc.) based on sensor data 104, map data 110, or other data. The sub-control system 101 may include different subsystems for performing various autonomy operations. The subsystems may include a localization system 130, a perception system 140, a planning system 150, and a control system 160. The localization system 130 can determine the location of the autonomous vehicle within its environment; the perception system 140 can detect, classify, and track objects and actors in the environment; the planning system 150 can determine a trajectory for the autonomous vehicle; and the control system 160 can translate the trajectory into vehicle controls for controlling the autonomous vehicle. The sub-control system(s) 101 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the sub-control system(s) 101 can be shared among its subsystems, or a subsystem can have a set of dedicated computing resources.

In some implementations, the autonomous vehicle control system 100 can be implemented for or by an autonomous vehicle (e.g., a ground-based autonomous vehicle). The autonomous vehicle control system 100 can perform various processing techniques on inputs (e.g., the sensor data 104, the map data 110) to perceive and understand the vehicle's surrounding environment and generate an appropriate set of control outputs to implement a vehicle motion plan (e.g., including one or more trajectories) for traversing the vehicle's surrounding environment. In some implementations, an autonomous vehicle implementing the autonomous vehicle control system 100 can drive, navigate, operate, etc. with minimal or no interaction from a human operator (e.g., driver, pilot, etc.).

In some implementations, the autonomous vehicle can be configured to operate in a plurality of operating modes. For instance, the autonomous vehicle can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous vehicle can operate in a semi-autonomous operating mode in which the autonomous vehicle can operate with some input from a human operator present in the autonomous vehicle (or a human operator that is remote from the autonomous platform). In some implementations, the autonomous vehicle can enter into a manual operating mode in which the autonomous vehicle is fully controllable by a human operator (e.g., human driver, etc.) and can be prohibited or disabled (e.g., temporary, permanently, etc.) from performing autonomous navigation (e.g., autonomous driving, etc.). The autonomous vehicle can be configured to operate in other modes such as, for example, park or sleep modes (e.g., for use between tasks such as waiting to provide a trip/service, recharging, etc.). In some implementations, the autonomous vehicle can implement vehicle operating assistance technology (e.g., collision mitigation system, power assist steering, etc.), for example, to help assist the human operator of the autonomous platform (e.g., while in a manual mode, etc.).

The autonomous vehicle control system 100 can be located onboard (e.g., on or within) an autonomous vehicle and can be configured to operate the autonomous vehicle in various environments. The environment may be a real-world environment or a simulated environment. In some implementations, one or more simulation computing devices can simulate one or more of: the sensors 102, the sensor data 104, communication interface(s) 106, the platform data 108, or the platform control devices 112 for simulating operation of the autonomous vehicle control system 100.

In some implementations, the sub-control system(s) 101 can communicate with one or more networks or other systems with communication interface(s) 106. The communication interface(s) 106 can include any suitable components for interfacing with one or more network(s), including, for example, transmitters, receivers, ports, controllers, antennas, or other suitable components that can help facilitate communication. In some implementations, the communication interface(s) 106 can include a plurality of components (e.g., antennas, transmitters, or receivers, etc.) that allow it to implement and utilize various communication techniques (e.g., multiple-input, multiple-output (MIMO) technology, etc.).

In some implementations, the sub-control system(s) 101 can use the communication interface(s) 106 to communicate with one or more computing devices that are remote from the autonomous vehicle over one or more network(s). For instance, in some examples, one or more inputs, data, or functionalities of the sub-control system(s) 101 can be supplemented or substituted by a remote system communicating over the communication interface(s) 106. For instance, in some implementations, the map data 110 can be downloaded over a network to a remote system using the communication interface(s) 106. In some examples, one or more of the localization system 130, the perception system 140, the planning system 150, or the control system 160 can be updated, influenced, nudged, communicated with, etc. by a remote system for assistance, maintenance, situational response override, management, etc.

The sensor(s) 102 can be located onboard the autonomous platform. In some implementations, the sensor(s) 102 can include one or more types of sensor(s). For instance, one or more sensors can include image capturing device(s) (e.g., visible spectrum cameras, infrared cameras, etc.). Additionally or alternatively, the sensor(s) 102 can include one or more depth capturing device(s). For example, the sensor(s) 102 can include one or more LIDAR sensor(s) or Radio Detection and Ranging (RADAR) sensor(s). The sensor(s) 102 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 102 for capturing depth information can be fixed to a rotational device in order to rotate the sensor(s) 102 about an axis. The sensor(s) 102 can be rotated about the axis while capturing data in interval sector packets descriptive of different portions of a three-hundred-and-sixty-degree view of a surrounding environment of the autonomous platform. In some implementations, one or more of the sensor(s) 102 for capturing depth information can be solid state.

The sensor(s) 102 can be configured to capture the sensor data 104 indicating or otherwise being associated with at least a portion of the environment of the autonomous vehicle. The sensor data 104 can include image data (e.g., 2D camera data, video data, etc.), RADAR data, LIDAR data (e.g., 3D point cloud data, etc.), audio data, or other types of data. In some implementations, the sub-control system(s) 101 can obtain input from additional types of sensors, such as inertial measurement units (IMUs), altimeters, inclinometers, odometry devices, location or positioning devices (e.g., GPS, compass), wheel encoders, or other types of sensors. In some implementations, the sub-control system(s) 101 can obtain sensor data 104 associated with particular component(s) or system(s) of the autonomous vehicle. This sensor data 104 can indicate, for example, wheel speed, component temperatures, steering angle, cargo or passenger status, etc. In some implementations, the sub-control system(s) 101 can obtain sensor data 104 associated with ambient conditions, such as environmental or weather conditions. In some implementations, the sensor data 104 can include multi-modal sensor data. The multi-modal sensor data can be obtained by at least two different types of sensor(s) (e.g., of the sensors 102) and can indicate static and/or dynamic object(s) or actor(s) within an environment of the autonomous vehicle. The multi-modal sensor data can include at least two types of sensor data (e.g., camera and LIDAR data). In some implementations, the autonomous vehicle can utilize the sensor data 104 for sensors that are remote from (e.g., offboard) the autonomous vehicle. This can include for example, sensor data 104 captured by a different autonomous vehicle.

The sub-control system(s) 101 can obtain the map data 110 associated with an environment in which the autonomous vehicle was, is, or will be located. The map data 110 can provide information about an environment or a geographic area. For example, the map data 110 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous vehicle in understanding its surrounding environment and its relationship thereto. In some implementations, the map data 110 can include high-definition map information. Additionally or alternatively, the map data 110 can include sparse map data (e.g., lane graphs, etc.). In some implementations, the sensor data 104 can be fused with or used to update the map data 110 in real time.

The sub-control system(s) 101 can include the localization system 130, which can provide an autonomous vehicle with an understanding of its location and orientation in an environment. In some examples, the localization system 130 can support one or more other subsystems of the sub-control system(s) 101, such as by providing a unified local reference frame for performing, e.g., perception operations, planning operations, or control operations.

In some implementations, the localization system 130 can determine a current position of the autonomous vehicle. A current position can include a global position (e.g., respecting a georeferenced anchor, etc.) or relative position (e.g., respecting objects in the environment, etc.). The localization system 130 can generally include or interface with any device or circuitry for analyzing a position or change in position of an autonomous vehicle. For example, the localization system 130 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous vehicle can be used by various subsystems of the sub-control system(s) 101 or provided to a remote computing system (e.g., using the communication interface(s) 106).

In some implementations, the localization system 130 can register relative positions of elements of a surrounding environment of the autonomous vehicle with recorded positions in the map data 110. For instance, the localization system 130 can process the sensor data 104 (e.g., LIDAR data, RADAR data, camera data, etc.) for aligning or otherwise registering to a map of the surrounding environment (e.g., from the map data 110) to understand the autonomous vehicle's position within that environment. Accordingly, in some implementations, the autonomous vehicle can identify its position within the surrounding environment (e.g., across six axes, etc.) based on a search over the map data 110. In some implementations, given an initial location, the localization system 130 can update the autonomous vehicle's location with incremental re-alignment based on recorded or estimated deviations from the initial location. In some implementations, a position can be registered directly within the map data 110.

In some implementations, the map data 110 can include a large volume of data subdivided into geographic tiles, such that a desired region of a map stored in the map data 110 can be reconstructed from one or more tiles. For instance, a plurality of tiles selected from the map data 110 can be stitched together by the sub-control system 101 based on a position obtained by the localization system 130 (e.g., a number of tiles selected in the vicinity of the position).

In some implementations, the localization system 130 can determine positions (e.g., relative or absolute) of one or more attachments or accessories for an autonomous vehicle. For instance, an autonomous vehicle can be associated with a cargo platform, and the localization system 130 can provide positions of one or more points on the cargo platform. For example, a cargo platform can include a trailer or other device towed or otherwise attached to or manipulated by an autonomous vehicle, and the localization system 130 can provide for data describing the position (e.g., absolute, relative, etc.) of the autonomous vehicle as well as the cargo platform. Such information can be obtained by the other autonomy systems to help operate the autonomous vehicle.

The sub-control system(s) 101 can include the perception system 140, which can allow an autonomous platform to detect, classify, and track objects and actors in its environment. Environmental features or objects perceived within an environment can be those within the field of view of the sensor(s) 102 or predicted to be occluded from the sensor(s) 102. This can include object(s) not in motion or not predicted to move (static objects) or object(s) in motion or predicted to be in motion (dynamic objects/actors).

The perception system 140 can determine one or more states (e.g., current or past state(s), etc.) of one or more objects that are within a surrounding environment of an autonomous vehicle. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 140 can determine the state(s) using one or more algorithms or machine-learned models configured to identify/classify objects based on inputs from the sensor(s) 102. The perception system can use different modalities of the sensor data 104 to generate a representation of the environment to be processed by the one or more algorithms or machine-learned models. In some implementations, state(s) for one or more identified or unidentified objects can be maintained and updated over time as the autonomous vehicle continues to perceive or interact with the objects (e.g., maneuver with or around, yield to, etc.). In this manner, the perception system 140 can provide an understanding about a current state of an environment (e.g., including the objects therein, etc.) informed by a record of prior states of the environment (e.g., including movement histories for the objects therein). Such information can be helpful as the autonomous vehicle plans its motion through the environment.

The sub-control system(s) 101 can include the planning system 150, which can be configured to determine how the autonomous platform is to interact with and move within its environment. The planning system 150 can determine one or more motion plans for an autonomous platform. A motion plan can include one or more trajectories (e.g., motion trajectories) that indicate a path for an autonomous vehicle to follow. A trajectory can be of a certain length or time range. The length or time range can be defined by the computational planning horizon of the planning system 150. A motion trajectory can be defined by one or more waypoints (with associated coordinates). The waypoint(s) can be future location(s) for the autonomous platform. The motion plans can be continuously generated, updated, and considered by the planning system 150.

The planning system 150 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 150 can determine a desired trajectory for executing a strategy. For instance, the planning system 150 can obtain one or more trajectories for executing one or more strategies. The planning system 150 can evaluate trajectories or strategies (e.g., with scores, costs, rewards, constraints, etc.) and rank them. For instance, the planning system 150 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 150 can utilize static cost(s) to evaluate trajectories for the autonomous platform (e.g., "avoid lane boundaries," "minimize jerk," etc.). Additionally or alternatively, the planning system 150 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 150 can rank trajectories based on one or more static costs, one or more dynamic costs, or a combination thereof. The planning system 150 can select a motion plan (and a corresponding trajectory) based on a ranking of a plurality of candidate trajectories. In some implementations, the planning system 150 can select a highest ranked candidate, or a highest ranked feasible candidate.

The planning system 150 can then validate the selected trajectory against one or more constraints before the trajectory is executed by the autonomous platform.

To help with its motion planning decisions, the planning system 150 can be configured to perform a forecasting function. The planning system 150 can forecast future state(s) of the environment. This can include forecasting the future state(s) of other actors in the environment. In some implementations, the planning system 150 can forecast future state(s) based on current or past state(s) (e.g., as developed or maintained by the perception system 140). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous vehicle. Additionally or alternatively, the probabilities can include probabilities conditioned on trajectory options available to one or more other actors.

To implement selected motion plan(s), the sub-control system(s) 101 can include a control system 160 (e.g., a vehicle control system). Generally, the control system 160 can provide an interface between the sub-control system(s) 101 and the platform control devices 112 for implementing the strategies and motion plan(s) generated by the planning system 150. For instance, the control system 160 can implement the selected motion plan/trajectory to control the autonomous platform's motion through its environment by following the selected trajectory (e.g., the waypoints included therein). The control system 160 can, for example, translate a motion plan into instructions for the appropriate platform control devices 112 (e.g., acceleration control, brake control, steering control, etc.). By way of example, the control system 160 can translate a selected motion plan into instructions to adjust a steering component (e.g., a steering angle) by a certain number of degrees, apply a certain magnitude of braking force, increase/decrease speed, etc. In some implementations, the control system 160 can communicate with the platform control devices 112 through communication channels including, for example, one or more data buses (e.g., controller area network (CAN), etc.), onboard diagnostics connectors (e.g., OBD-II, etc.), or a combination of wired or wireless communication links. The platform control devices 112 can send or obtain data, messages, signals, etc. to or from the sub-control system(s) 101 (or vice versa) through the communication channel(s).

The sub-control system(s) 101 can receive, through communication interface(s) 106, assistive signal(s) from remote assistance system 170. Remote assistance system 170 can communicate with the sub-control system(s) 101 over a network. In some implementations, the sub-control system(s) 101 can initiate a communication session with the remote assistance system 170. For example, the sub-control system(s) 101 can initiate a session based on or in response to a trigger. In some implementations, the trigger may be an alert, an error signal, a map feature, a request, a location, a traffic condition, a road condition, etc.

After initiating the session, the sub-control system(s) 101 can provide context data to the remote assistance system 170. The context data may include sensor data 104 and state data of the autonomous vehicle. For example, the context data may include a live camera feed from a camera of the autonomous vehicle and the autonomous vehicle's current speed. An operator (e.g., human operator) of the remote assistance system 170 can use the context data to select assistive signals. The assistive signal(s) can provide values or adjustments for various operational parameters or characteristics for the sub-control system(s) 101. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the sub-control system(s) 101.

The sub-control system(s) 101 can use the assistive signal(s) for input into one or more autonomy subsystems for performing autonomy functions. For instance, the planning system 150 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning system 150. Additionally or alternatively, assistive signal(s) can be considered by the sub-control system(s) 101 as suggestive inputs for consideration in addition to other received data (e.g., sensor inputs, etc.).

The sub-control system(s) 101 may be platform agnostic, and the control system 160 can provide control instructions to platform control devices 112 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 2:
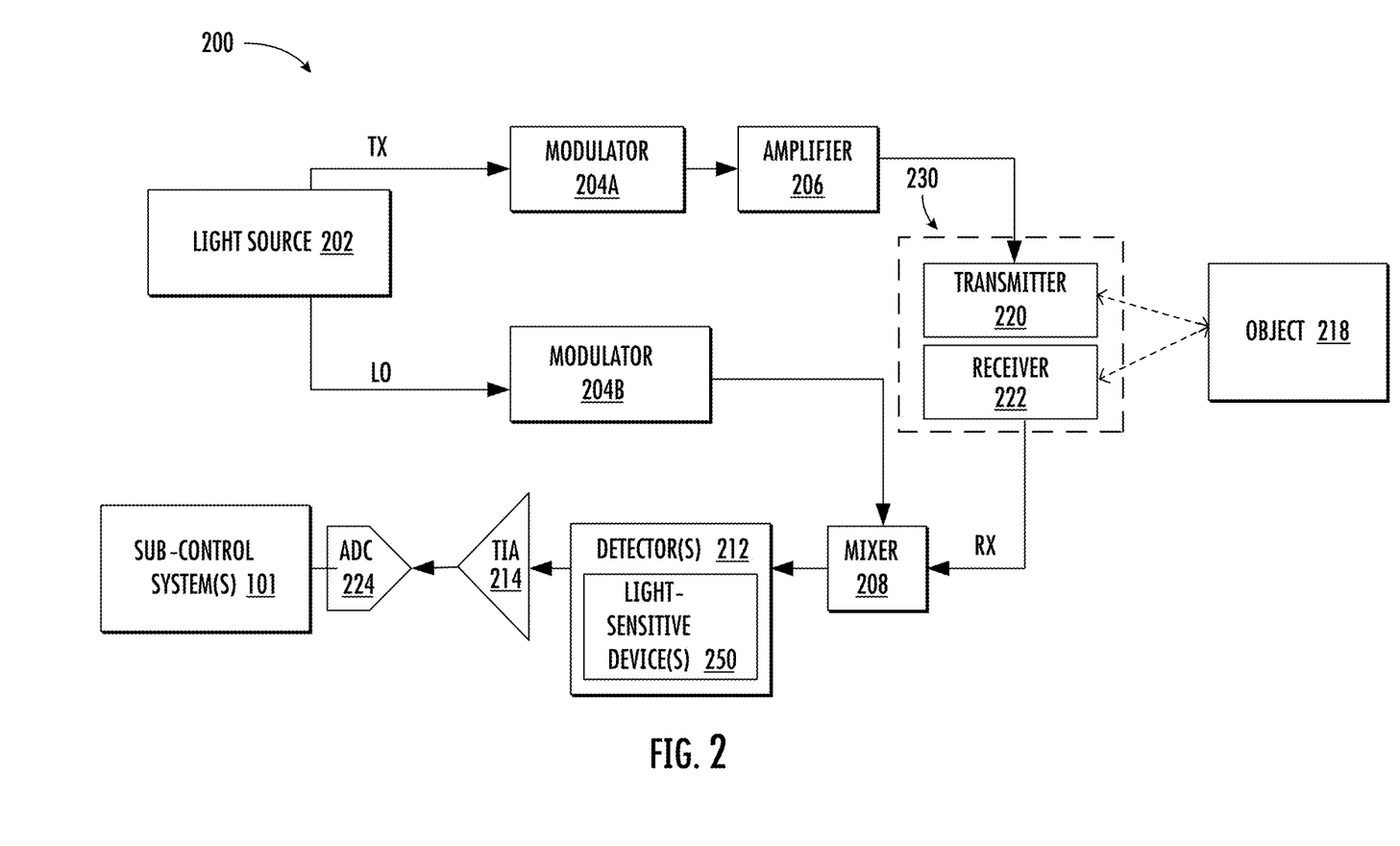
FIG. 2 depicts a block diagram of an example LIDAR system according to some implementations of the present disclosure.

FIG. 2 is a block diagram illustrating an example LIDAR system for autonomous vehicles, according to some implementations. The environment includes a LIDAR system 200 that includes a transmit (Tx) path and a receive (Rx) path. The Tx path includes one or more Tx input/output ports (e.g., channels), and the Rx path includes one or more Rx input/output ports (e.g., channels). In some implementations, a semiconductor substrate and/or semiconductor package may include the Tx path and/or the Rx path. In some implementations, the semiconductor substrate and/or semiconductor package may include at least one of silicon photonics circuitry, programmable logic controller (PLC), or group III-V semiconductor circuitry.

In some implementations, a first semiconductor substrate and/or a first semiconductor package may include the Tx path and a second semiconductor substrate and/or a second semiconductor package may include the Rx path. In some arrangements, the Rx input/output ports and/or the Tx input/output ports may occur (or be formed/disposed/located/placed) along one or more edges of one or more semiconductor substrates and/or semiconductor packages.

The LIDAR system 200 can be coupled to one or more sub-control system(s) 101 (e.g., the sub-control system(s) 101 of FIG. 1). In some implementations, the sub-control system(s) 101 may be coupled to the Rx path via the one or more Rx input/output ports. For instance, the sub-control system(s) 101 can receive LIDAR outputs from the LIDAR system 200. The sub-control system(s) 101 can control a vehicle (e.g., an autonomous vehicle) based on the LIDAR outputs.

The Tx path may include a light source (e.g., light source) 202, a modulator 204A, a modulator 204B, an amplifier 206, and one or more transmitters 220. The Rx path may include one or more receivers 222, a mixer 208, a detector 212, a transimpedance amplifier (TIA) 214, and one or more analog-to-digital converters (ADCs) 224. Although FIG. 2 shows only a select number of components and only one input/output channel, the LIDAR system 200 may include any number of components and/or input/output channels (in any combination) that are interconnected in any arrangement to facilitate combining multiple functions of a LIDAR system, to support the operation of a vehicle.

The light source 202 may be configured to generate a light signal (or beam) that is derived from (or associated with) a local oscillator (LO) signal. In some implementations, the light signal may have an operating wavelength that is equal to or substantially equal to 1550 nanometers. In some implementations, the light signal may have an operating wavelength that is between 1400 nanometers and 1440 nanometers.

The light source 202 may be configured to provide the light signal to the modulator 204A, which is configured to modulate a phase and/or a frequency of the light signal based on a first radio frequency (RF) signal (e.g., an "RF1" signal) to generate a modulated light signal, such as by Continuous Wave (CW) modulation or quasi-CW modulation. The modulator 204A may be configured to send the modulated light signal to the amplifier 206. The amplifier 206 may be configured to amplify the modulated light signal to generate an amplified light signal for transmission via the one or more transmitters 220. The one or more transmitters 220 may include one or more optical waveguides or antennas. In some implementations, modulator 204A and/or modulator 204B may have a bandwidth between 400 megahertz (MHz) and 1000 (MHz).

The LIDAR system 200 includes one or more transmitters 220 and one or more receivers 222. The transmitter(s) 220 and/or receiver(s) 222 can be included in a transceiver 230. The transmitter(s) 220 can provide the transmit beam that it receives from the Tx path into an environment within a given field of view toward an object 218. The one or more receivers 222 can receive a received beam reflected from the object 218 and provide the received beam to the mixer 208 of the Rx path. The one or more receivers 222 may include one or more optical waveguides or antennas. In some arrangements, the one or more transceivers 230 may include a monostatic transceiver or a bistatic transceiver.

The light source 202 may be configured to provide the LO signal to the modulator 204B, which is configured to modulate a phase and/or a frequency of the LO signal based on a second RF signal (e.g., an "RF2" signal) to generate a modulated LO signal (e.g., using Continuous Wave (CW) modulation or quasi-CW modulation) and send the modulated LO signal to the mixer 208 of the Rx path. The mixer 208 may be configured to mix (e.g., combine, multiply, etc.) the modulated LO signal with the returned signal to generate a down-converted signal and send the down-converted signal to the detector 212.

In some arrangements, the mixer 208 may be configured to send the modulated LO signal to the detector 212 (or detectors). The detector 212 may be configured to generate an electrical signal based on the down-converted signal and send the electrical signal to a transimpedance amplifier (TIA) 214. In some arrangements, the detector 212 may be configured to generate an electrical signal based on the down-converted signal and the modulated signal. The TIA 214 may be configured to amplify the electrical signal and send the amplified electrical signal to the sub-control system(s) 101 via the one or more ADCs 224. In some implementations, the TIA 214 may have a peak noise-equivalent power (NEP) that is less than 5 picowatts per square root Hertz (i.e., $5 \times 10^{-12}$ Watts per square root Hertz). In some implementations, the TIA 214 may have a gain between 4 kiloohms and 25 kiloohms. In some implementations, detector 212 and/or TIA 214 may have a 3-decibel bandwidth between 80 kilohertz (kHz) and 450 megahertz (MHz). The sub-control system(s) 101 may be configured to determine a distance to the object 218 and/or measure the velocity of the object 218 based on the one or more electrical signals that it receives from the TIA 214 via the one or more ADCs 224.

The detector(s) 212 may include one or more light-sensitive device(s) 250. The light-sensitive device(s) 250 can be devices that are sensitive to light in their operations. For example, the light-sensitive device(s) 250 may operate differently (e.g., output a different signal type or value) depending upon an amount of light in the ambient environment of the light-sensitive device(s) 250. Examples of light-sensitive devices 250 include, but are not limited to, optical circuitry, photodetectors, optical receivers, and photodiodes. According to example aspects of the present disclosure, the optical isolation of the light-sensitive device(s) 250 can be improved, providing improved performance in detecting the object 218. Example aspects of the present disclosure may similarly be applied to other substrates and light-sensitive devices that may be present in the LIDAR system 200, such as light-sensitive devices for feedback or diagnostic systems in the LIDAR system 200.

Figure 3:
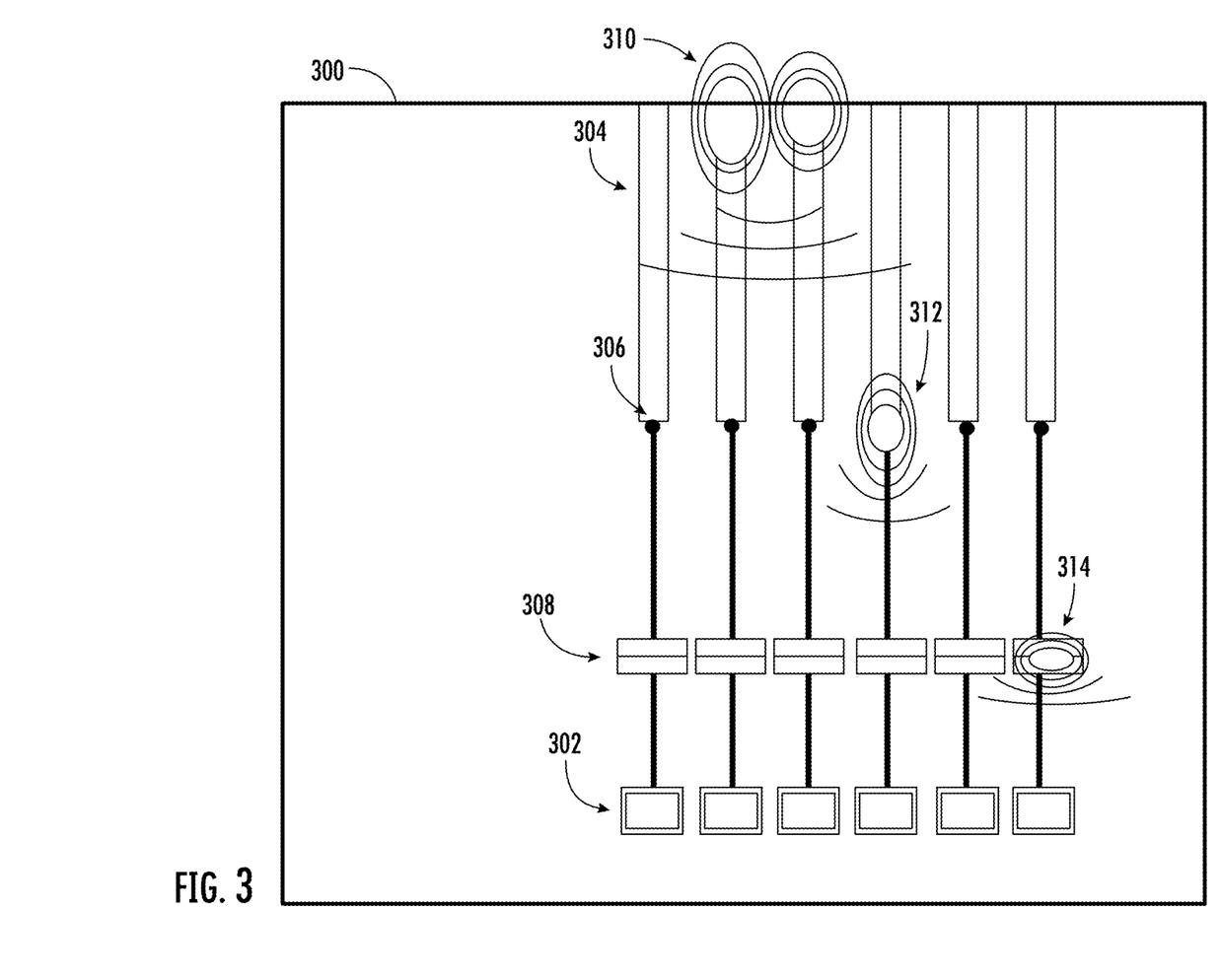
FIG. 3 depicts a diagram of an example substrate experiencing light leakage according to the present disclosure.

FIG. 3 depicts a diagram of a substrate 300 experiencing light leakage according to some aspects of the present disclosure. The substrate 300 includes photodiodes 302. The photodiodes 302 can be light-sensitive devices configured to output a signal depending upon an amount of light incident on the photodiode. One or more waveguides 304 can feed an input optical signal from the upper end of the substrate 300 (e.g., from a light source) to one or more pixels 308. A junction 306 can transfer light between disparate segments or portions of the waveguides 304. For example, the junction 306 can be an edge coupling. The pixels 308 can emit the light into an environment of a LIDAR system containing the substrate 300 and/or receive reflected light from the environment of the LIDAR system. Additional waveguides can feed the reflected light to the photodiodes 302. As used herein, "light" refers to energy of a suitable wavelength on the electromagnetic spectrum, which may include visible light and/or non-visible light.

As depicted in FIG. 3, stray light can enter the environment surrounding the substrate 300 in several manners. One such manner is illustrated by stray light 310. Stray light 310 depicts light entering the environment of the substrate 300 that is attributable to misalignment between the waveguides 304 of the substrate 300 and corresponding waveguides of an additional substrate coupled to the substrate 300. Even relatively minor misalignments, which may be cost-prohibitive or infeasible to otherwise correct, can contribute to light leakage into the environment of the substrate 300. Another form of stray light 312 is attributable to leakage from the junction 306 (e.g., due to misalignments, manufacturing defects, and so on). Yet another form of stray light 314 is attributable to defects at one of the pixels 308, such as a misalignment, stray reflected signal, or other unexpected light sourced from the pixel 308. The stray light 310, 312, 314 may not only be present in air above or below the substrate 300. In some implementations, the substrate 300 may be transparent to light at the wavelengths of the stray light 310, 312, 314, which can allow light to enter the substrate 300 and propagate along the substrate 300 (e.g., by internal reflection) in the direction of the photodiodes 302.

Figure 4A:
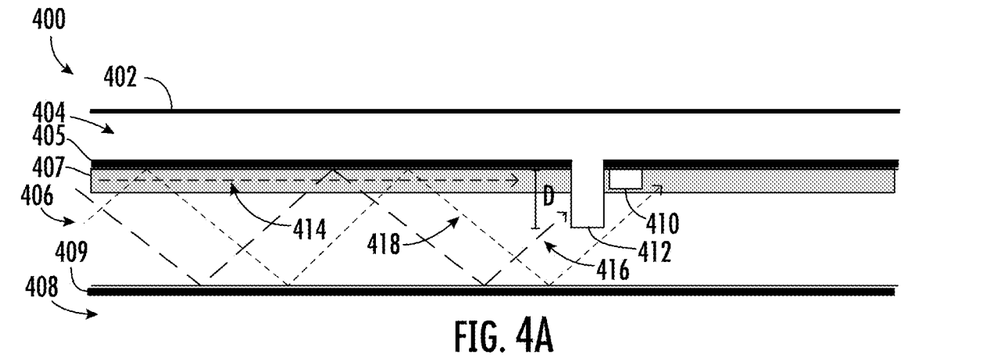
FIGS. 4A-4D depict cross-sectional views of various substrates according to some implementations of the present disclosure.

FIGS. 4A-4D depict cross-sectional views of various substrates according to example aspects of the present disclosure. These substrates can provide improved optical isolation of light-sensitive devices, as described further herein. For instance, FIG. 4A depicts a cross-sectional view of an example substrate 400 according to some implementations of the present disclosure. The substrate 400 is enclosed in a housing 402 (e.g., a housing of an integrated circuit, a LIDAR system, etc.). A front end of line (FEOL) region 404 can define a first side of the substrate 400. The FEOL region 404 may include air, vacuum, or other spacing between the housing 402 and a substrate body 406. Similarly, a back end of line (BEOL) region 408 can define a second side of the substrate 400. The BEOL region 408 may be coupled to additional components of a LIDAR system or other larger system. Additionally or alternatively, the BEOL region 408 may define a spacing between the substrate body 406 and another side of the housing 402 (not illustrated). The substrate 400 may be included in a LIDAR system, such as the LIDAR system 200 of FIG. 2. As one example, the substrate 400 may support the detector(s) 212 and/or the light-sensitive device(s) 250 of FIG. 2. Furthermore, in some implementations, the substrate 400 may be or may include a receiver die of a LIDAR sensor system.

A light-sensitive device 410 can be arranged on the substrate 400. For instance, in some implementations, the light-sensitive device 410 can be arranged on a first side (e.g., the FEOL region 404) of the substrate 400. In some implementations, the light-sensitive device 410 may be attached or coupled to a surface of the substrate 400. Additionally or alternatively, the light-sensitive device 410 may be embedded within the substrate 400, The light-sensitive device 410 may be arranged closer to a surface corresponding to the first side of the substrate 400 than a second surface corresponding to a second side (e.g., the BEOL region 408) of the substrate 400. The light-sensitive device 410 may be any suitable light-sensitive device, such as a photodiode, photodetector, optical hybrid, mixer, optical splitter, light source, or any other suitable light-sensitive device. Additional components (not illustrated) may be included in either the FEOL region 404 or the BEOL region 408. The present discussion is not intended to exclude substrates having light-sensitive devices at both sides of a substrate, and one of ordinary skill in the art will understand how aspects discussed herein can be extended to any suitable substrate.

The substrate 400 man include an oxide layer 407 formed on the substrate body 406. The oxide layer 407 can be or can include an oxide material, such as silicon dioxide ($SiO_2$) or another suitable oxide. The substrate body 406 can be or can include a semiconductor layer including any suitable semiconductor material, such as, but not limited to, silicon, a silicon compound, a group III-V semiconductor material (e.g., GaAs), or any other suitable semiconductor material. In some implementations, the oxide layer 407 can be arranged at the first side of the substrate 400 (e.g., the side having the light-sensitive device 410) and the semiconductor layer can be arranged at the second side of the substrate 400.

In some implementations, a shielding layer 405 can be arranged above the light-sensitive device 410 to prevent stray light from the FEOL region 404 from interfering with the light-sensitive device 410. While the inclusion of the shielding layer 405 may be beneficial, the substrate body 406 (e.g., the semiconductor layer) may be transparent to light. Therefore, light from various sources (e.g., misalignments, leakages, etc.) can enter the substrate body 406. Through total internal reflection (TIR), the light can propagate throughout the substrate body 406 even when the sides of the substrate 400 are shielded. Including the shielding layer 405 alone may accomplish little in mitigating the stray light already in the substrate body 406 from reaching the light-sensitive device 410.

To improve the optical isolation of the light-sensitive device 410, the substrate 400 can include optical isolation features as described herein. One such optical isolation feature is the blocking trench 412. The blocking trench 412 can be configured to optically isolate the light-sensitive device 410 from light entering the substrate 400. The blocking trench 412 can be an airgap trench, which is filled with a substance occupying an environment of the substrate 400. For instance, the blocking trench 412 can be filled with the same substance as the FEOL region 404 (e.g., the air between the housing 402 and the substrate body 406). In some implementations, the blocking trench 412 may be formed into the substrate 400, such as by an etch process. For instance, portions of the oxide layer 407 and/or the semiconductor layer (e.g., the substrate body 406) may be etched away to form the blocking trench 412. In some implementations, the blocking trench 412 may be formed into a first side of the substrate 400 (e.g., a same side as the light-sensitive device 410.) The blocking trench 412 can have one or more sidewalls that are generally planar and/or generally orthogonal to a direction of the sides of the substrate 400.

The blocking trench 412 can be configured to optically isolate the light-sensitive device 410 by reflecting light entering the substrate 400 through total internal reflection. For instance, the blocking trench 412 can be arranged such that light (depicted by rays 414, 416, and 418) that enters the substrate body 406 is blocked from becoming incident on the light-sensitive device 410 and reflected away from the light-sensitive device 410. As one example, ray 414 illustrates the path of travel of a beam of light entering the substrate body 406 parallel to the sides of the substrate 400. The light will travel until it is incident on the blocking trench 412, then will be reflected by the sidewalls of the blocking trench 412. The light can therefore fail to pass to the light-sensitive device 410 by reflecting off the sidewalls of the blocking trench 412. As another example, rays 416 and 418 illustrate light entering the substrate body 406 at an angle relative to the sides of the substrate 400. Because of the total internal reflection between the light and the sides of the substrate 400, the light will bounce off the sides of the substrate 400 as illustrated by the rays 416 and 418. As illustrated in FIG. 4A, however, the blocking trench 412 can be arranged such that the light either hits the blocking trench 412, as in the case of ray 416, or passes over the light-sensitive device 410, as in the case of ray 418. For instance, the blocking trench 412 can be arranged such that light which would normally be incident on the light-sensitive device 410 (e.g., light following the path of ray 416) can instead be reflected by the blocking trench 412.

The blocking trench 412 can extend a depth D into the substrate body 406. The depth D may be selected to balance factors such as optical isolation capability (e.g., to cover an increasing spectrum of angles at which the light may enter the substrate body 406) against structural integrity of the substrate 400. For instance, the depth D may be selected such that light entering the substrate body 406 in a spectrum of angles relative to the direction of the sides of the substrate 400 is either blocked (e.g., as in the case of ray 416) or passes over the light-sensitive device 410 (e.g., as in the case of ray 418). In some implementations, the substrate 400 can have a thickness, and a depth of the blocking trench 412 can be less than about one half of the thickness of the substrate 400 (e.g., between zero and one half the thickness of the substrate 400). For instance, in some implementations, the depth of blocking trench 412 can be between about 100 micrometers and about 500 micrometers, or between about 20 to about 300 micrometers, or between about 20 to about 200 micrometers. Any suitable depth D, up to the entire thickness of the substrate 400, may be employed in accordance with example aspects of the present disclosure.

Although a single blocking trench 412 is illustrated in FIG. 4A to block light entering from the left of the substrate body 406, one of ordinary skill in the art will readily ascertain how multiple or alternative optical isolation trenches 412 may be positioned around the light-sensitive device 410 to block light from other directions, such as the right of the substrate body 406 or in the direction of view relative to the cross-sectional view of FIG. 4A.

In some implementations, an antireflection layer 409 may be included on the substrate 400. For instance, the antireflection layer 409 may be included at the second side of the substrate 400 (e.g., a side opposite the light-sensitive device 410). The antireflection layer 409 may be formed on the substrate 400. For example, the antireflection layer 409 may be formed by deposition, film adhesion, or other suitable manner. The antireflection layer 409 may be configured such that light incident on the antireflection layer 409 does not experience total internal reflection. For instance, the reflected light off of a surface of the substrate 400 having the antireflection layer 409 may be reduced, diminished, or eliminated. In this manner, the antireflection layer 409 can provide for mitigating light entering the substrate 400 as it repeatedly reflects off the side of the substrate 400.

The combination of the antireflection layer 409 and optical isolation trenches 412 can be especially advantageous. For instance, the antireflection layer 409 can provide for reduced depth of the blocking trench 412, therefore improving structural integrity of the substrate 400. The depth of the blocking trench 412 can be selected to block light entering the substrate 400 at less than a certain angle relative to the sides of the substrate 400. Light that enters the substrate 400 at greater than that angle may reflect off the sides of the substrate 400 several times (due to the steep angle) before reaching the light-sensitive device 410, such that the light is significantly mitigated by the antireflection layer 409 over the multiple reflections. This high-angle light may therefore be weakened before reaching the light-sensitive device 410 such that it is unable to significantly affect the operation of the light-sensitive device 410.

Figure 4B:
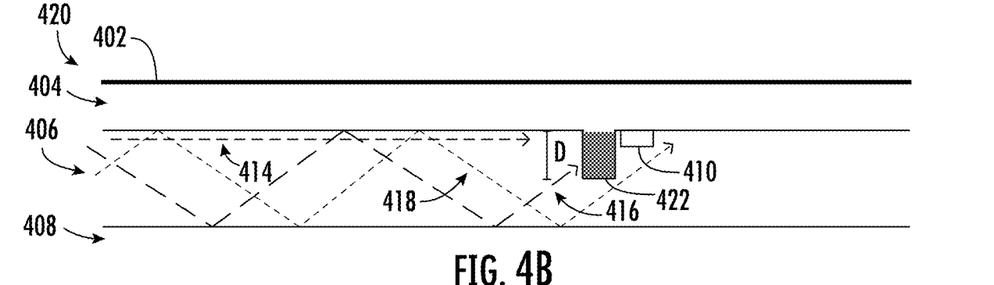

FIG. 4B depicts a cross-sectional view of another example substrate 420 according to some implementations of the present disclosure. The substrate 420 is similar to the substrate 400 of FIG. 4A. Except where otherwise indicated, components of substrate 420 depicted with the same reference numbers relative to substrate 400 are intended to have the characteristics discussed with regard to FIG. 4A. For instance, the substrate 420 includes a housing 402, a FEOL region 404, a substrate body 406, a BEOL region 408, and a light-sensitive device 410. The shielding layer 405, oxide layer 407, and antireflection layer 409 are not depicted in FIG. 4B for the purposes of illustration, but may nonetheless be included without departing from the present disclosure.

The substrate 420 includes a blocking trench 422. The blocking trench 422 is similar to the blocking trench 412 of FIG. 4A. Unlike the blocking trench 412, which is an airgap trench, the blocking trench 422 is a filled trench. The filled trench can have a light-absorbing filling. Instead of reflecting light through total internal reflection as in the case of the airgap trench 412, the filled trench can directly block or absorb the light incident on the filled trench. For instance, the filled trench may be opaque to the light. The light-absorbing filling can be any suitable light-absorbing filling, such as a metal, a ceramic, an organic compound, or a suspension. One example light-absorbing filling can be a fluid having carbon nanoparticles dispersed in nitrocellulose. The blocking trench 422 can absorb light following the path of ray 414 or ray 416, and light following the path of ray 418 can pass around the light-sensitive device 410. The use of a light-absorbing filling can provide improved structural integrity of the substrate 420 relative to an airgap trench.

Figure 4C:
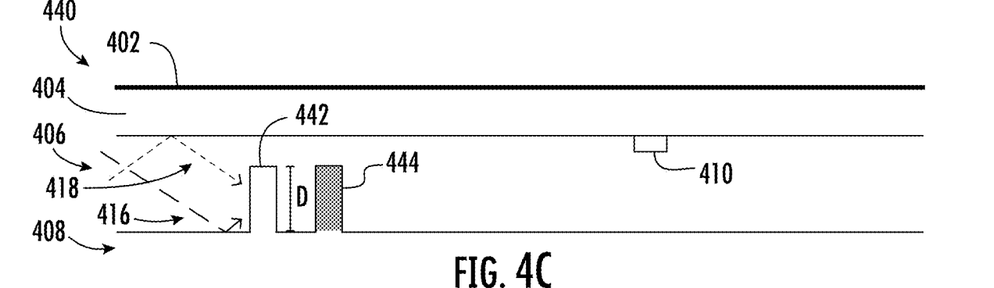
Figure 4D:
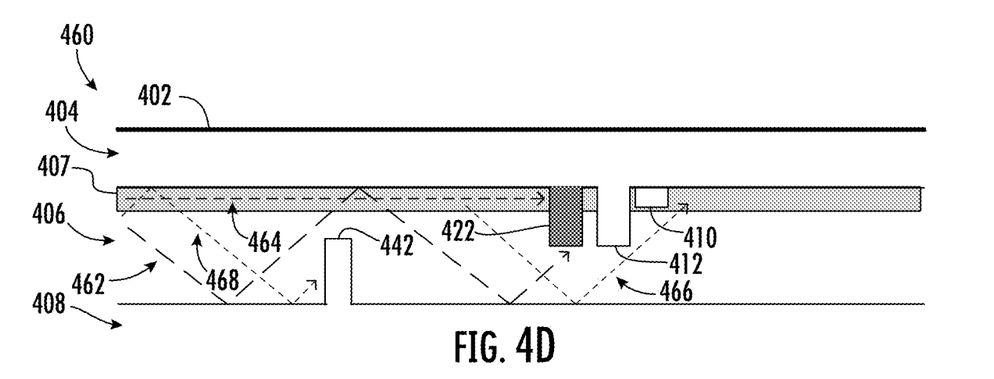

FIG. 4C depicts a cross-sectional view of another example substrate 440 according to some implementations of the present disclosure. The substrate 440 is similar to the substrate 400 of FIG. 4A. Except where otherwise indicated, components of substrate 440 depicted with same reference numbers relative to substrate 400 are intended to have the characteristics discussed with regard to FIG. 4A. For instance, the substrate 440 includes a housing 402, a FEOL region 404, a substrate body 406, a BEOL region 408, and a light-sensitive device 410. The shielding layer 405, oxide layer 407, and antireflection layer 409 are not depicted in FIG. 4C for the purposes of illustration, but may nonetheless be included without departing from the present disclosure.

The substrate 440 includes an airgap trench 442 and a filled trench 444. Similar to the blocking trench 412 of FIG. 4A, the airgap trench 442 can be filled with a substance surrounding the environment of the substrate 440, such as air at the BEOL side. Furthermore, similar to the blocking trench 422 of FIG. 4B, the filled trench 444 can be filled with a light-absorbing filling, such as a metal, a ceramic, an organic compound, or a suspension. The trenches 442 and 444 may be formed at the second side of the substrate body 406 (e.g., opposite a first side having the light-sensitive device 410). The trenches 442 and 444 may be formed at a farther distance from the light-sensitive device 410 than some trenches formed on the first side (e.g., the trenches 412, 422 of FIGS. 4A and 4B). Furthermore, in some implementations, one or more of airgap trench 442 and/or filled trench 444 may be present on substrate 440. For instance, more or fewer airgap trenches 442 and/or filled trenches 444 (including an embodiment having only one of airgap trenches 442 or filled trenches 444) may be present on substrate 440 without departing from the present disclosure.

The optical isolation trenches 442, 444 can extend a depth D into the substrate body 406. The depth D may be selected to balance factors such as optical isolation capability (e.g., to cover an increasing spectrum of angles at which the light may enter the substrate body 406) against structural integrity of the substrate 440. For instance, the depth D may be selected such that a significant portion light entering the substrate body 406 is blocked (e.g., in the cases of both ray 416 and 418. In some implementations, the substrate 440 can have a thickness, and a depth of the optical isolation trenches 442, 444 can be less than about one half of the thickness of the substrate 440 (e.g., between zero and one half the thickness of the substrate 440). For instance, in some implementations, the depth of optical isolation trenches 442, 444 can be between about 100 micrometers and about 500 micrometers. Any suitable depth D, up to the entire thickness of the substrate 440, may be employed in accordance with example aspects of the present disclosure. In some implementations, a greater depth D may be employed for optical isolation trenches on the second side of the substrate 440 (e.g., the trenches 442, 444) than on the first side of the substrate 440 (e.g., the trenches 412, 422 of FIGS. 4A and 4B) to provide for a greater range of One of ordinary skill in the art will readily understand how additional combinations of trenches described herein can be formed without departing from the present disclosure. For example, the first side of the substrate and the second side of the substrate may each have a single trench or multiple trenches, in any combination. As another example, in addition to forming trenches on both sides of the substrate, trenches may be arranged on both sides of the light-sensitive device 410. The trenches may have various shapes. For example, the trenches may have rectangular, square, V, or half-circular shapes from a cross-sectional view. The trenches may fully enclose or partially enclose the light-sensitive device 410 from a top-down view. For example, the trenches may be cylinders or squares that fully enclose the light-sensitive device 410 from a top-down view, or they may be partial cylinders or squares that partially enclose the light-sensitive device 410 from a top-down view.

Figure 5A:
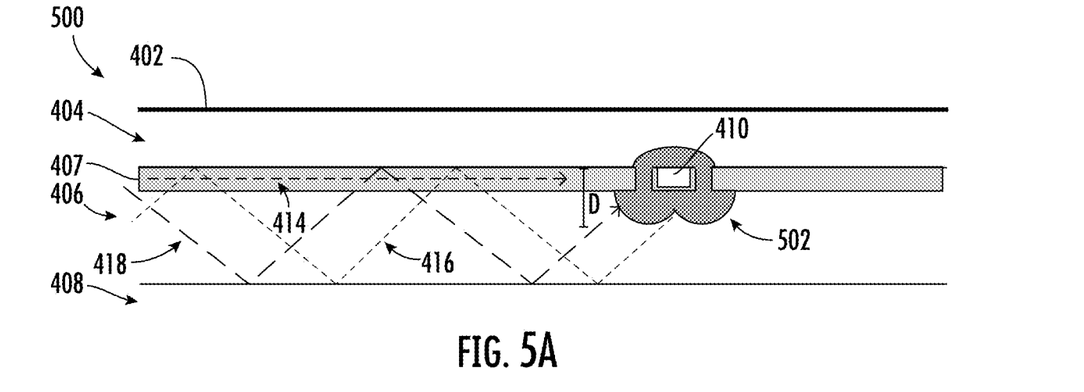
FIG. 5A depicts a cross-sectional view of an example substrate according to some implementations of the present disclosure.

FIG. 5A depicts a cross-sectional view of another example substrate 500 according to some implementations of the present disclosure. The substrate 500 is similar to the substrate 400 of FIG. 4A. Except where otherwise indicated, components of substrate 500 depicted with same reference numbers relative to substrate 400 are intended to have the characteristics discussed with regard to FIG. 4A. For instance, the substrate 500 includes a housing 402, a FEOL region 404, a substrate body 406, an oxide layer 407, a BEOL region 408, and a light-sensitive device 410. The shielding layer 405 and antireflection layer 409 are not depicted in FIG. 5A for the purposes of illustration, but may nonetheless be included without departing from the present disclosure.

FIG. 5A illustrates an example substrate 500 having an undercut trench 502. The undercut trench 502 can form a cavity in the substrate 500 (e.g., the substrate body 406) under the light-sensitive device 410. The cavity can be filled with a light-absorbing filling. The undercut trench 502 can directly block or absorb the light incident on the undercut trench. For instance, the undercut trench 502 may be opaque to the light. The light-absorbing filling can be any suitable light-absorbing filling, such as a metal, a ceramic, an organic compound, or a suspension. One example light-absorbing filling can be a fluid having carbon nanoparticles dispersed in nitrocellulose. In particular, the undercut trench 502 can block light from above and below the light-sensitive device 410, as well as from at least two lateral directions (e.g., the left and right of the cross-sectional view). In some implementations, the undercut trench 502 may be formed such that light in all directions, except for that of a waveguide leading into the light-sensitive device 410, is blocked. As used herein, terminology such as "above" is used to refer to the direction of the FEOL region 404 and terminology such as "under," "below," or "underneath" is used to refer to the direction of the BEOL region 408 for explanatory purposes. This terminology is not intended to invoke any particular arrangement of the substrate 500 itself, such as relative to a LIDAR system, earth gravity, or other arrangement. For instance, the substrate 500 may be mounted in a "flip chip" configuration where the FEOL region 404 is facing "downwards" (e.g., towards a larger substrate) without departing from the present disclosure.

Figure 5B:
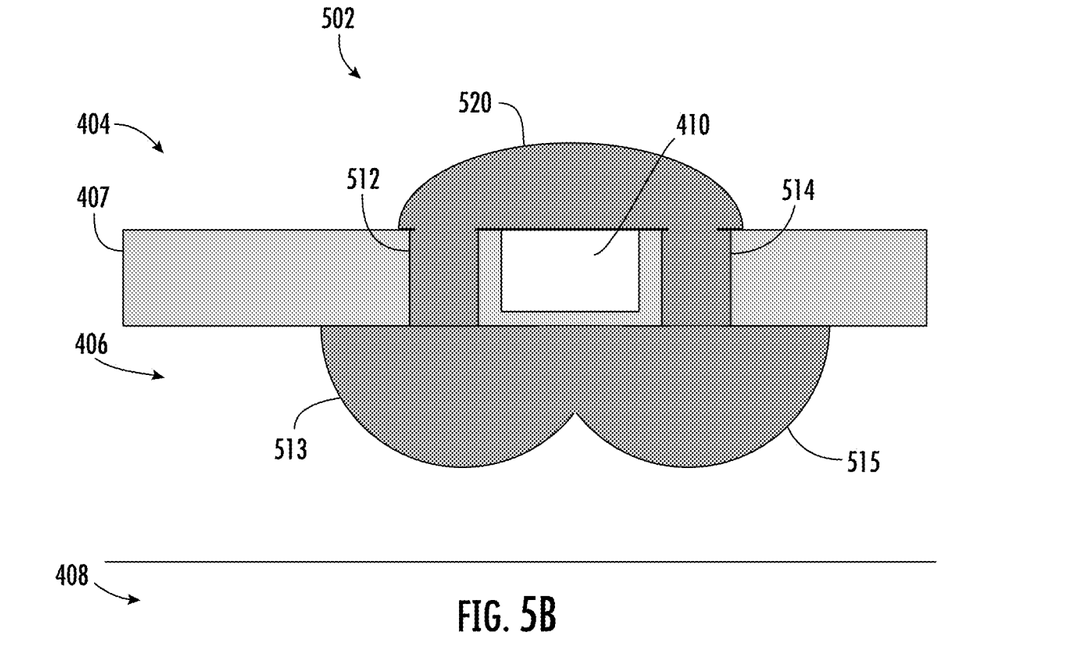
FIG. 5B depicts an enlarged view of an example undercut trench according to some implementations of the present disclosure.

FIG. 5B illustrates an enlarged view of the undercut trench 502. The undercut trench 502 can be formed of two (or more) filled trenches, including the first filled trench 512 and the second filled trench 514. During formation of the filled trench 512, a corresponding undercut region 513 is formed by continual etching of the substrate 500. Similarly, an undercut region 515 is formed during formation of the filled trench 514. The undercut regions 513 and 515 can have a greater horizontal component (e.g., width) than the respective filled trenches 512 and 514. In this manner, the undercut regions 513, 515 can overlap underneath the light-sensitive device 410 and shield the light-sensitive device 410 from light in the substrate body 406. The undercut trench 502 can further include an overfill portion 520 that shields the light-sensitive device 410 from light in the FEOL region 404.

Figure 6:
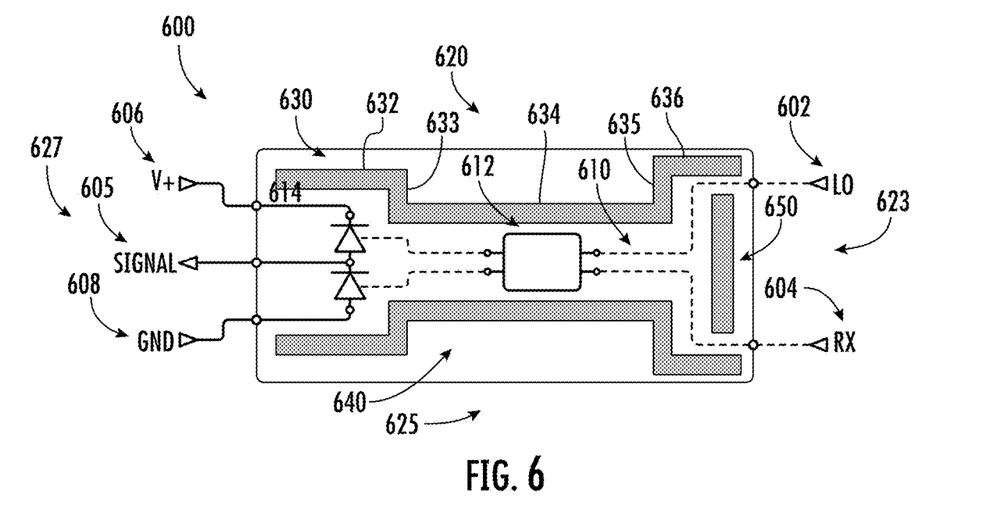
FIG. 6 depicts a diagram of example optical isolation features according to some implementations of the present disclosure.

FIG. 6 depicts an example system according to some implementations of the present disclosure. The system can be, for example, a coherent receiver having a balanced photodetector with improved optical isolation. As one example, the system can include a receiver die 600 including the depicted components.

The receiver die 600 can include a local oscillator (LO) input 602 and a receive (Rx) input 604. Generally, the receiver die 600 can utilize the LO input 602 and the Rx input 604 to produce a detection signal 605 indicating characteristics of detected objects in an environment of a LIDAR system including the receiver die 600. To facilitate this detection, at least one balanced pair of photodiodes 614 can be coupled to a mixer 612 configured to receive at least the receive (Rx) signal at Rx input 604 and produce the detection signal 605 based on the receive signal. More particularly, the LO input 602 and the Rx input 604 can be provided by one or more waveguides 610 (illustrated as dashed lines in FIG. 6) to a 2×2 integrated photonic optical mixer 612. The mixer 612 can mix the LO input 602 and the Rx input 604 to produce intermediate signals, which are provided to a balanced pair of photodiodes 614. The photodiode pair 614 includes one end connected to a voltage reference 606 and another end connected to ground 608. The detection signal 605 is taken from between the photodiode pair 614. The detection signal 605, the voltage reference 606, and the ground 608 can be electrical signals carried by wires (illustrated as solid lines in FIG. 6). Components of this system, such as the photodiode pair 614, the optical mixer 612, and/or the waveguides 610 can be sensitive to stray light in the receiver die 600.

To provide improved optical isolation according to example aspects of the present disclosure, one or more optical isolation trenches can be configured to optically isolate the light-sensitive components of the receiver die 600. For instance, the receiver die 600 can include a first optical isolation trench 630, a second optical isolation trench 640, and a third optical isolation trench 650. In some implementations, more or fewer optical isolation trenches may be included without departing from the present disclosure. For instance, in some implementations, the third optical isolation trench 650 may be omitted. The optical isolation trenches 630, 640, 650 can be airgap trenches, filled trenches, undercut trenches, or other suitable optical isolation trenches. For instance, a cross section of the receiver die 600 may generally resemble one of FIGS. 4A-4D and/or FIG. 5.

The one or more optical isolation trenches (e.g., 630, 640, 650) can be arranged such that light does not pass in a direct path through the receiver die 600. For instance, the receiver die 600 can include a first end 620 and a second end 625 opposite the first end 620. The first optical isolation trench 630 can extend along the first end 620. Additionally or alternatively, the second optical isolation trench 640 can extend along the second end 625. A third end 623 may extend between the first end 620 and the second end 625. For instance, the third end 623 may be orthogonal to the first end 620 and/or the second end 625. The third end 623 may be proximate at least one waveguide 610 that is directing light towards the receiver die 600 (e.g., the inputs 602, 604). For instance, the third optical isolation trench 650 may be configured to block stray light caused by misalignment or other imperfections in the direction of the inputs 602, 604. Finally, a fourth end 627 can be opposite the third end 623. The fourth end 627 can include terminals for one or more electrical signals such as the detection signal 605, the voltage reference 606, and/or the ground 608.

The trenches 630, 640, 650 may be arranged such that light may not enter from one end of the receiver die 600 (e.g., the first end 620) and pass through to another end of the receiver die 600 (e.g., the second end 625) without encountering at least one optical isolation trench. For instance, as illustrated in FIG. 6, any straight line envisioned through the receiver die 600 can encounter at least one optical isolation trench or portion thereof. In this manner, light may be blocked from reaching the light-sensitive components (e.g., photodiode pair 614). The optical isolation trenches 630 and 640, along the first end 620 and second end 625 respectively, can be formed in a linear shape with a recessed portion that captures light from the inputs 602, 604. For instance, the first optical isolation trench 630 can include a first lateral portion 632 and a second lateral portion 636 along the respective first end 620 of the receiver die 600. The trench 630 can additionally include a third lateral portion 634. The third lateral portion 634 can be offset relative to the first lateral portion 632 and the second lateral portion 636. For instance, the third lateral portion 634 can be closer to a center of the receiver die 600 than the first lateral portion 632 and the second lateral portion 636 are to the center of the receiver die 600. The trench 630 can additionally include radial portions 633 and 635 coupling the lateral portions 632, 634, and 636. For instance, the first radial portion 633 can be connected to the first lateral portion 632 and the third lateral portion 634. Additionally or alternatively, the second radial portion 635 can be connected to the second lateral portion 636 and the third lateral portion 634. At least one of the first radial portion 633 or the second radial portion 635 can extend along the third end 623 or the fourth end 627 of the receiver die 600.

Figure 7:
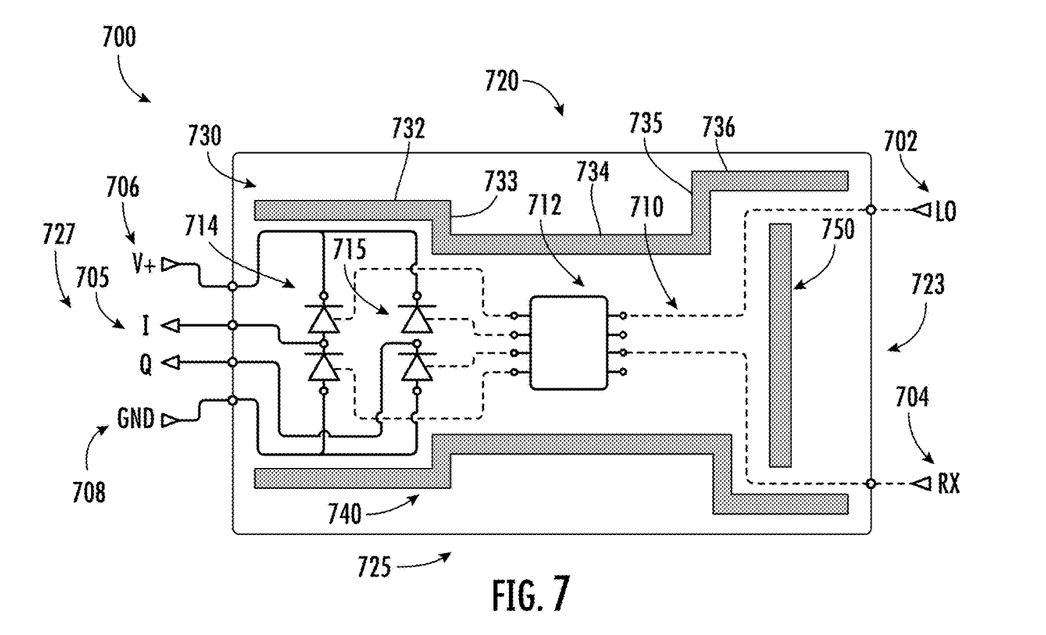
FIG. 7 depicts a diagram of example optical isolation features according to some implementations of the present disclosure.

FIG. 7 depicts an example system according to some implementations of the present disclosure. The system can be, for example, a coherent receiver having an optical hybrid with improved optical isolation. As one example, the system can include a receiver die 700 including the depicted components.

The receiver die 700 can include a local oscillator (LO) input 702 and a receive (Rx) input 704. Generally, the receiver die 700 can utilize the LO input 702 and the Rx input 704 to produce detection signals 705 indicating characteristics of detected objects in an environment of a LIDAR system including the receiver die 700. To facilitate this detection, two balanced pairs of photodiodes 714 and 715 can be coupled to an optical hybrid 712 configured to receive at least a receive (Rx) signal from Rx input 704 and produce the detection signals 705 based on the receive signal. More particularly, the LO input 702 and the Rx input 704 can be provided by one or more waveguides 710 (illustrated as dashed lines in FIG. 7) to the optical hybrid 712. The optical hybrid 712 can combine the LO input 702 and the Rx input 704 to produce intermediate signals, which are provided to a first balanced pair of photodiodes 714 to produce an in-phase signal I and a second balanced pair of photodiodes 715 to produce a quadrature-phase signal Q. The object detection may be determined from these phase signals I and Q. The photodiode pairs 714 and 715 respectively include one end connected to a voltage reference 706 and another end connected to ground 708. The detection signal(s) (e.g., phase signals) 705, the voltage reference 706, and the ground 708 can be electrical signals carried by wires (illustrated as solid lines in FIG. 7). Components of this system, such as the photodiode pairs 714 and 715, the optical hybrid 712, and/or the waveguides 710 can be sensitive to stray light in the receiver die 700.

To provide improved optical isolation according to example aspects of the present disclosure, one or more optical isolation trenches can be configured to optically isolate the light-sensitive components of the receiver die 700. For instance, the receiver die 700 can include a first optical isolation trench 730, a second optical isolation trench 740, and a third optical isolation trench 750. In some implementations, more or fewer optical isolation trenches may be included without departing from the present disclosure. For instance, in some implementations, the third optical isolation trench 750 may be omitted. The optical isolation trenches 730, 740, 750 can be airgap trenches, filled trenches, undercut trenches, or other suitable optical isolation trenches. For instance, a cross section of the receiver die 700 may generally resemble one of FIGS. 4A-4D and/or FIG. 5.

The one or more optical isolation trenches (e.g., 730, 740, 750) can be arranged such that light does not pass in a direct path through the receiver die 700. For instance, the receiver die 700 can include a first end 720 and a second end 725 opposite the first end 720. The first optical isolation trench 730 can extend along the first end 720. Additionally or alternatively, the second optical isolation trench 740 can extend along the second end 725. A third end 723 may extend between the first end 720 and the second end 725. For instance, the third end 723 may be orthogonal to the first end 720 and/or the second end 725. The third end 723 may be proximate at least one waveguide 710 that is directing light towards the receiver die 700 (e.g., the inputs 702, 704). For instance, the third optical isolation trench 750 may be configured to block stray light caused by misalignment or other imperfections in the direction of the inputs 702, 704. Finally, a fourth end 727 can be opposite the third end 723. The fourth end 727 can include terminals for one or more electrical signals such as the detection signal 705, the voltage reference 706, and/or the ground 708.

The trenches 730, 740, 750 may be arranged such that light may not enter from one end of the receiver die 700 (e.g., the first end 720) and pass through to another end of the receiver die 700 (e.g., the second end 725) without encountering at least one optical isolation trench. For instance, as illustrated in FIG. 7, any straight line envisioned through the receiver die 700 can encounter at least one optical isolation trench or portion thereof. In this manner, light may be blocked from reaching the light-sensitive components (e.g., photodiode pairs 714 and 715). The optical isolation trenches 730 and 740, along the first end 720 and second end 725 respectively, can be formed in a linear shape with a recessed portion that captures light from the inputs 702, 704. For instance, the first optical isolation trench 730 can include a first lateral portion 732 and a second lateral portion 736 along the respective first end 720 of the receiver die 700. The trench 730 can additionally include a third lateral portion 734. The third lateral portion 734 can be offset relative to the first lateral portion 732 and the second lateral portion 736. For instance, the third lateral portion 734 can be closer to a center of the receiver die 700 than the first lateral portion 732 and the second lateral portion 736 are to the center of the receiver die 700. The trench 730 can additionally include radial portions 733 and 735 coupling the lateral portions 732, 734, and 736. For instance, the first radial portion 733 can be connected to the first lateral portion 732 and the third lateral portion 734. Additionally or alternatively, the second radial portion 735 can be connected to the second lateral portion 736 and the third lateral portion 734. At least one of the first radial portion 733 or the second radial portion 735 can extend along the third end 723 or the fourth end 727 of the receiver die 700.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on." As used herein, "about" in conjunction with a stated numerical value is intended to refer inclusively to within twenty percent of the stated numerical value, except where otherwise indicated.

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

The following describes the technology of this disclosure within the context of a LIDAR system and an autonomous vehicle for example purposes only. As described herein, the technology described herein is not limited to an autonomous vehicle and can be implemented for or within other systems, autonomous platforms, and other computing systems.

What is claimed is:

1. A LIDAR system for a vehicle, the LIDAR system comprising:
    a receiver die comprising one or more light sensitive components; and
    one or more optical isolation trenches configured to optically isolate the one or more light sensitive components on the receiver die;
    wherein the one or more optical isolation trenches are arranged such that light does not pass in a direct path through the receiver die; and
    wherein the one or more optical isolation trenches comprise a first optical isolation trench extending along a first end of the receiver die, the first optical isolation trench comprising:
    a first lateral portion and a second lateral portion extending along the first end; and
    a third lateral portion offset relative to the first lateral portion and the second lateral portion such that the third lateral portion is closer to a center of the receiver die than the first lateral portion and the second lateral portion; and
    at least one waveguide configured to direct light from an input of the receiver die to the one or more light sensitive components, the at least one waveguide extending in a lateral direction defined by the first end.

2. The LIDAR system of claim 1, wherein:
    the receiver die comprises a second end opposite the first end; and
    the one or more optical isolation trenches comprise a second optical isolation trench extending along the second end.

3. The LIDAR system of claim 2, wherein the first optical isolation trench comprises:
    a first radial portion connected to the first lateral portion and the third lateral portion; and
    a second radial portion connected to the second lateral portion and the third lateral portion.

4. The LIDAR system of claim 3, wherein at least one of the first radial portion or the second radial portion extend along a third end of the receiver die, the third end of the receiver die orthogonal to the first end and the second end.

5. The LIDAR system of claim 4, wherein the third end of the receiver is proximate the input of the receiver die, and wherein the receiver die further comprises a third optical isolation trench extending along the third end.

6. The LIDAR system of claim 5, wherein the input of the receiver die comprises a local oscillator (LO) input or a receive (Rx) signal input.

7. The LIDAR system of claim 5, wherein the receiver die further comprises a fourth end opposite the third end, and wherein the fourth end comprises one or more signal outputs.

8. The LIDAR system of claim 7, wherein the one or more signal outputs comprise one or more of a voltage signal, a ground signal, or a detection signal.

9. The LIDAR system of claim 1, wherein the one or more light sensitive components comprise one or more photodetectors.

10. The LIDAR system of claim 9, wherein the one or more photodetectors comprise at least one balanced pair of photodiodes.

11. The LIDAR system of claim 10, wherein the at least one balanced pair of photodiodes is coupled to a mixer configured to receive at least a receive (Rx) signal and produce one or more detection signals based on the receive signal.

12. A LIDAR system for a vehicle, the LIDAR system comprising:
    a receiver die comprising:
        one or more photodetectors;
        a mixer coupled to the one or more photodetectors, the mixer configured to receive at least a receive (Rx) signal and produce one or more detection signals based on the receive signal; and
        one or more optical isolation trenches configured to optically isolate the one or more photodetectors on the receiver die;
        wherein the one or more optical isolation trenches are arranged such that light does not pass in a direct path through the receiver die; and
        wherein the one or more optical isolation trenches comprise a first optical isolation trench extending along a first end of the receiver die, the first optical isolation trench comprising:
        a first lateral portion and a second lateral portion extending along the first end; and
        a third lateral portion offset relative to the first lateral portion and the second lateral portion such that the third lateral portion is closer to a center of the receiver die than the first lateral portion and the second lateral portion; and
        at least one waveguide configured to direct light from an input of the receiver die to the one or more light sensitive components, the at least one waveguide extending in a lateral direction defined by the first end.

13. The LIDAR system of claim 12, wherein the one or more photodetectors comprise at least one balanced pair of photodiodes.

14. The LIDAR system of claim 12, wherein:
    the receiver die comprises a second end opposite the first end; and
    the one or more optical isolation trenches comprise a second optical isolation trench extending along the second end.

15. The LIDAR system of claim 14, wherein the first optical isolation trench comprises:
    a first radial portion connected to the first lateral portion and the third lateral portion; and
    a second radial portion connected to the second lateral portion and the third lateral portion.

16. The LIDAR system of claim 15, wherein at least one of the first radial portion or the second radial portion extend along a third end of the receiver die, the third end of the receiver die orthogonal to the first end and the second end.

17. A LIDAR system for a vehicle, the LIDAR system comprising:
  a receiver die comprising:
    one or more photodetectors;
    an optical hybrid coupled to the one or more photodetectors, the optical hybrid configured to receive at least a receive (Rx) signal and produce one or more detection signals based on the receive signal; and
    one or more optical isolation trenches configured to optically isolate the one or more photodetectors on the receiver die;
  wherein the one or more optical isolation trenches are arranged such that light does not pass in a direct path through the receiver die; and
  wherein the one or more optical isolation trenches comprise a first optical isolation trench extending along a first end of the receiver die, the first optical isolation trench comprising:
    a first lateral portion and a second lateral portion extending along the first end; and
    a third lateral portion offset relative to the first lateral portion and the second lateral portion such that the third lateral portion is closer to a center of the receiver die than the first lateral portion and the second lateral portion; and
  at least one waveguide configured to couple the receive signal from an input of the receiver die to the optical hybrid, the at least one waveguide extending in a lateral direction defined by the first end.

18. The LIDAR system of claim 17, wherein the one or more photodetectors comprises a first balanced pair of photodiodes and a second balanced pair of photodiodes.

19. The LIDAR system of claim 18, wherein the optical hybrid is configured to receive a local oscillator (LO) signal and to combine the local oscillator (LO) signal and the receive (Rx) signal to produce first and second intermediate signals that are respectively provided to the first and second balanced pairs of photodiodes.

20. The LIDAR system of claim 17, wherein:
  the receiver die comprises a second end opposite the first end; and
  the one or more optical isolation trenches comprise a second optical isolation trench extending along the second end.

* * * * *